T. BRENNAN.
FEED BAG ATTACHMENT.
APPLICATION FILED OCT. 22, 1907.
903,169.
Patented Nov. 10, 1908.
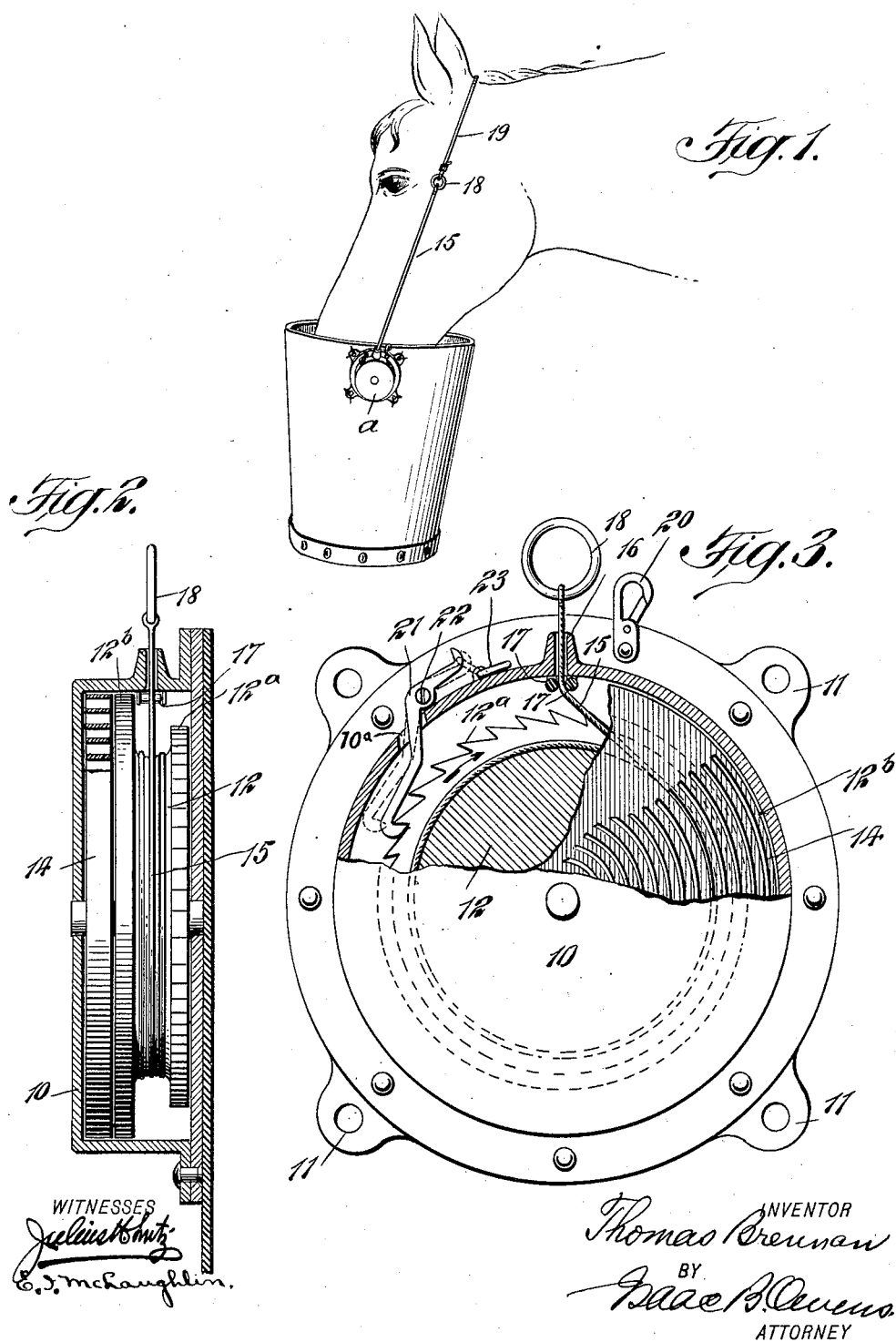

UNITED STATES PATENT OFFICE.

THOMAS BRENNAN, OF NEW YORK, N. Y.

FEED-BAG ATTACHMENT.

No. 903,169.	Specification of Letters Patent.	Patented Nov. 10, 1908.

Application filed October 22, 1907. Serial No. 398,587.

*To all whom it may concern:*

Be it known that I, THOMAS BRENNAN, of the city, county, and State of New York, have invented certain new and useful Improvements in Feed-Bag Attachments, of which the following is a full, clear, and exact specification, such as will enable others skilled in the art to which it appertains to make and use the same.

The object of my invention is to provide a feed bag with means by which it will be raised automatically as the feed is consumed by the horse, thus holding the feed within easy reach of the horse at all times and preventing the horse from throwing his head to reach the feed. Heretofore, it has been necessary to raise the bag up manually as the feed is consumed or to allow the horse to swing the bag thus wasting much of its contents.

In attaining the end in view, I provide the bag with one or more peculiarly constructed spring winding devices by which the bag is raised as fast as the feed is consumed. By means of my invention, I am enabled to construct these devices light and simple, thus making them thoroughly practical, and readily adapted to various forms of feed bags.

Reference is had to the accompanying drawings, which illustrate, as an example, the preferred form of my invention, in which drawings, Figure 1 is a view showing the device in use; Fig. 2 is an enlarged vertical section; and Fig. 3 is a side elevation of the device with parts broken away.

10 indicates a case suitably constructed of metal and provided with ears 11 by which it may be sewed, riveted or otherwise fastened to the bag as indicated in Fig. 1. Within this case is arranged a reel 12, one flange 12$^a$ of which is formed with ratchet teeth and the other flange 12$^b$ of which is projected into close proximity with the sides of the case.

14 indicates a spring which is contained within the casing 10 and confined by the flange 12$^b$ as shown in Fig. 2. This spring is attached to the reel 12 and to the casing and tends to wind the reel in the direction indicated by the arrow in Fig. 3. Over the reel 12 is wound a cord, wire or the like 15 which passes out through a bossed opening 16 in the case 10 and is guided by anti-friction rollers 17. This wire or cord is provided at its end with a ring 18 adapted to be connected with a cord, strap or the like 19 as shown in Fig. 1. While I prefer the ring 18 for this purpose, it is not essential and any similar connecting device may be used instead.

20 indicates a snap hook or the like secured to the case 10 and fitted to be engaged by the ring 18 when the device is not in use. The cord or strap 19 is tied or knotted to the ring 18 so that it may be adjusted to suit the bag to the horse's head. The dog 21 is pivoted at 22 on the case 10 and projects through an opening 10$^a$ therein to engage a ratchet 12$^a$.

23 indicates a swinging ring which is connected to the casing 10 and serves to hold the dog in the position shown by dotted lines in Fig. 3.

In the use of the device, two of the casings with their parts are fastened to the bag, one at each side and the strap or cord 19 is adjusted to the head of the horse, the wires 15 being drawn out as shown in Fig. 1. As the feed is consumed by the horse, the springs 14 wind the cords or wires 15 on the reels 12 and thus raise the bag, keeping the feed continually before the horse. As the reels 12 wind the cords thereon, the rings 23 being disconnected from the dogs allows them to engage the ratchets 12$^a$ and thus prevents back movement thereof. The result of this is that the horse in swinging his head from one side to the other cannot cause the bag to spring up and down. On the contrary, the bag will be held up firmly as fast as the reels raise it. When it is desired to unwind the bag, the dogs 21 may be moved to the dotted position and held by the rings 23 thus allowing the reels freedom of motion in both directions. When the bag is to be carried around from one point to another, in order to render the spring devices inactive for this time, the hooks 20 are provided with which hooks the rings 18 are engaged. The bag may then be carried by the strap 19 and it will in this adjustment be supported by the hooks 20 as contradistinguished from the spring 14 and may be carried freely without allowing it to move vertically under the action of the spring 14.

Various changes may be made in the form, details and proportions of the device without departing from my invention and I therefore regard myself as entitled to all such changes as lie within the terms of the claims.

Having thus described my invention, what

I claim as new and desire to secure by Letters Patent of the United States is:—

1. A feed bag attachment comprising a case adapted to be secured to the feed bag and having two openings in the outer circumference thereof, a reel mounted to turn within the case, the reel having two flanges of which one is formed peripherally with ratchet teeth, a cord wound over the reel and passing through one of the openings in the case, a spring located within the case, and connected with the reel and with a relatively stationary part for the purpose specified, a dog pivoted intermediate its ends outside of the case, one end of the dog projecting through the second opening in the case and engaging the ratchet teeth and means for releasably holding said dog in inactive position, such means engaging the second end of the dog.

2. A feed bag attachment comprising a case adapted to be secured to the feed bag and having two openings in the outer circumference thereof, a reel mounted to turn within the case, the reel having two flanges of which one is formed peripherally with ratchet teeth, a cord wound over the reel and passing through one of the openings in the case, a spring located within the case and connected with the reel and with a stationary part for the purpose specified, a dog pivoted intermediate its ends outside of the case, one end of the dog projecting through the second opening in the case and engaging the ratchet teeth, means for releasably holding said dog in inactive position, such means engaging the second end of the dog, a ring attached to the end of the cord and a device secured to the case and adapted releasably to engage the ring to prevent the cord from being drawn out of the case.

In testimony whereof I have signed my name to this specification in the presence of two subscribing witnesses.

THOMAS BRENNAN.

Witnesses:
THOMAS GREGORY,
ISAAC B. OWENS.